UNITED STATES PATENT OFFICE.

LYLE J. PLETCHER, OF BERWYN, ILLINOIS, ASSIGNOR TO FIGARO CHEMICAL CO., OF DALLAS, TEXAS, A CORPORATION OF ARIZONA.

COVERING FOR MEATS.

1,394,349. Specification of Letters Patent. Patented Oct. 18, 1921.

No Drawing. Application filed December 6, 1920. Serial No. 428,717.

*To all whom it may concern:*

Be it known that I, LYLE J. PLETCHER, a citizen of the United States, residing at Berwyn, in the county of Cook and State of Illinois, have invented new and useful Improvements in Coverings for Meats, of which the following is a specification.

This invention relates to coverings for meats, and the like, and it comprises a covering consisting of pariffin and an aromatic asphaltum compound in which the materials are mixed in proper proportions, heated to liquefy them, and the meat or other substance to be coated is dipped into the mixture.

In the prior art, there has been disclosed certain preservative compounds in which the use of crude or native asphaltum is set forth. These compositions produce a sticky material that does not completely dry, and which is therefore inconvenient to handle or pack.

In the present invention, I have produced a composition for use in preserving wherein the material, when dry, is a perfect protection from air and moisture, and in which the surface of the cover is not sticky. The composition provides a preservative that is not brittle when exposed to low temperatures, and in which no outer coating of any sort is necessary.

The composition forming the subject matter of the invention consists mainly of an aromatic asphaltum compound, which is preferably present in the mixture in a proportion greater than 70%, and may form about 90% of the mixture. The other ingredient used is paraffin which is preferably present in less than 30% of the mixture and generally in about 10%.

In preparing the compound, the ingredients, in their proper proportions are heated to liquefy them and mixed. They may be mixed in any suitable manner, as by stirring and mechanical mixing apparatus of any suitable type may be employed. When the asphaltum and paraffin are thoroughly mixed, the compound is ready for use.

In using the compound it is first heated to liquefy it and then maintained at a temperature sufficiently high to keep it liquid. The meat or other substance to be preserved is first wrapped in paper in the manner heretofore employed, and then wrapped in cloth. After wrapping it is ready for coating, and it is then dipped into the melted compound, and hung up to cool. Upon cooling the compound solidifies and a coating is obtained that is absolutely air tight and which does not interfere with handling of the meat in packing and storing.

The coating produced is not sticky when dry and the packages of meat do not have to be provided with an auxiliary cover, as is the case when many of the coating compounds heretofore known are used.

The composition disclosed produces a coating that will not become brittle in cold weather, but which is pliable and resembles a piece of soft leather in appearance and physical characteristics.

As stated the most advantageous proportions in which the ingredients are mixed is 90% aromatic asphaltum compound to 10% paraffin but these proportions may be varied within wide limits. However, I find it best to always have more than 50% of the aromatic asphaltum compound present.

While I have described an advantageous embodiment of the invention, it is to be understood that various changes may be made in the method of procedure, and that known chemical equivalents may be substituted for the ingredients without departing from the spirit of the invention or the scope of the claims.

What I claim is:

1. A preservation coating comprising a mixture of paraffin and an aromatic asphaltum compound, the asphaltum compound being present in more than 50% of the mixture.

2. A preservation coating comprising a mixture of more than 70% aromatic asphaltum compound and less than 30% paraffin.

3. A preservation coating comprising a mixture of 90% aromatic asphaltum compound and 10% paraffin.

4. A preservative coating comprising a mixture of paraffin and an aromatic asphaltum compound.

In testimony whereof, I affix my signature.

LYLE J. PLETCHER.